US012742103B2

(12) United States Patent
Oka et al.

(10) Patent No.: US 12,742,103 B2
(45) Date of Patent: Sep. 22, 2026

(54) METHOD FOR MANUFACTURING SEAL BODY, AND SEAL BODY

(71) Applicant: NOK CORPORATION, Tokyo (JP)

(72) Inventors: Shinichiro Oka, Kanagawa (JP); Kensuke Sekiguchi, Kanagawa (JP); Yuichi Aoyagi, Kanagawa (JP); Keita Suzuki, Kanagawa (JP)

(73) Assignee: NOK CORPORATION (JP)

(*) Notice: Subject to any disclaimer, the term of this patent is extended or adjusted under 35 U.S.C. 154(b) by 181 days.

(21) Appl. No.: 18/290,654

(22) PCT Filed: Jul. 27, 2022

(86) PCT No.: PCT/JP2022/028911
§ 371 (c)(1),
(2) Date: Jan. 19, 2024

(87) PCT Pub. No.: WO2023/026752
PCT Pub. Date: Mar. 2, 2023

(65) Prior Publication Data

US 2025/0084288 A1 Mar. 13, 2025

(30) Foreign Application Priority Data

Aug. 25, 2021 (JP) ................................ 2021-137103

(51) Int. Cl.
*C09J 133/06* (2006.01)
*B29D 99/00* (2010.01)
*C08F 220/18* (2006.01)
*F16J 15/3284* (2016.01)
*B29K 33/04* (2006.01)
*B29K 105/00* (2006.01)
*B29K 105/24* (2006.01)

(52) U.S. Cl.
CPC ...... *C09J 133/062* (2013.01); *B29D 99/0053* (2013.01); *C08F 220/1802* (2020.02);
(Continued)

(58) Field of Classification Search
CPC ............ C09J 133/062; B29D 99/0085; B29D 99/0053; F16J 15/108
(Continued)

(56) References Cited

U.S. PATENT DOCUMENTS

2001/0000788 A1* 5/2001 Ono ...................... C08K 3/013 524/544
2002/0061961 A1 5/2002 Yabe et al.
(Continued)

FOREIGN PATENT DOCUMENTS

EP 2508779 A1 * 10/2012 ......... B29C 45/0013
EP 4015545 A1 6/2022
(Continued)

OTHER PUBLICATIONS

Kambe, Y., et al., "English machine-translation by Clarivate Analytics of WO2021065669A1 with full WO patent application included", Sep. 24, 2020. (Year: 2020).*
(Continued)

*Primary Examiner* — Abbas Rashid
*Assistant Examiner* — Gregory C. Grosso
(74) *Attorney, Agent, or Firm* — Harness, Dickey & Pierce, P.L.C.

(57) ABSTRACT

A method for manufacturing a seal body includes a belt-like body forming step including a crosslinking agent adding step in which a crosslinking agent is added to a compound containing a halogen group-containing monomer as a constituent unit and mixed, a kneading step for kneading the obtained mixture, a pressurizing step for pressurizing the kneaded material, and a cutting step for cutting the pressurized body into a belt-like body, and a press-fixing step including a press-fixing/heating step of press-fixing one end and the other end of the belt-like body to form an endless seal body.

4 Claims, 5 Drawing Sheets

(52) U.S. Cl.
CPC ....... *F16J 15/3284* (2013.01); *B29K 2033/04* (2013.01); *B29K 2105/0002* (2013.01); *B29K 2105/24* (2013.01); *C08F 2810/20* (2013.01)

(58) Field of Classification Search
USPC ....................................................... 156/304.1
See application file for complete search history.

(56) References Cited

U.S. PATENT DOCUMENTS

2013/0337218 A1* 12/2013 Liu .................. B29C 66/91411 156/110.1
2014/0346707 A1* 11/2014 Yanagiguchi .............. C08J 3/24 525/200
2022/0363793 A1* 11/2022 Kambe ................ C09K 3/1006

FOREIGN PATENT DOCUMENTS

JP 2002-212341 A 7/2002
JP 2002-264004 A 9/2002
JP 2007-051257 A 3/2007
JP 2013-163807 A 8/2013
JP 2015-520052 A 7/2015
WO 2021/065669 A1 4/2021

OTHER PUBLICATIONS

International Search Report (English and Japanese) and Written Opinion (Japanese) of the ISA issued in PCT/JP2022/028911, mailed Oct. 18, 2022; ISA/JP. (9 pages).

* cited by examiner

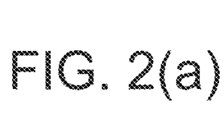
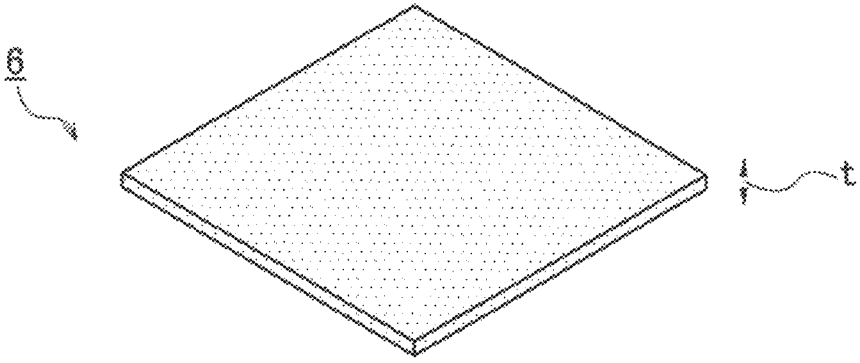
FIG. 2(b)
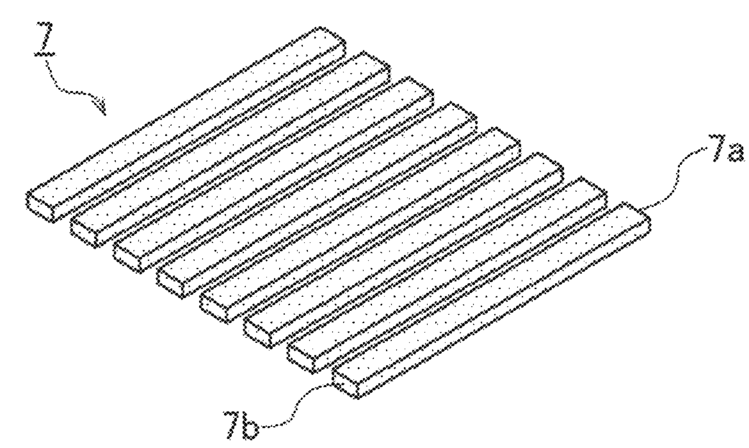
FIG. 2(c)
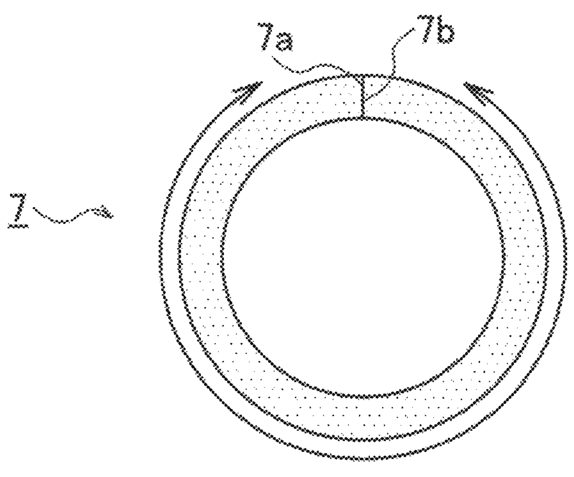
FIG. 2(d)
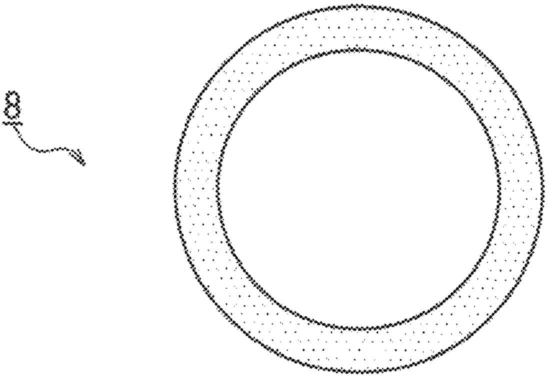

METHOD FOR MANUFACTURING SEAL BODY, AND SEAL BODY

CROSS REFERENCE TO RELATED APPLICATIONS

This application is a U.S. National Phase application under 35 U.S.C. 371 of International Application No. PCT/JP2022/028911, filed on Jul. 27, 2022, which claims priority to Japanese Patent Application No. 2021-137103, filed on Aug. 25, 2021. The entire disclosures of the above applications are expressly incorporated by reference herein.

BACKGROUND

Technical Field

The present invention relates to a method for manufacturing a seal body and a seal body. More specifically, the present invention relates to a method for manufacturing a seal body having an endless shape (or an annular shape) that has a self-healing function and can be manufactured without requiring a molding process using a mold, and a seal body that can be manufactured using the manufacturing method.

Related Art

Conventionally, in order to prevent leakage of a fluid such as a liquid such as water or oil or a gas, or to prevent impurities such as dirt and dust from entering from outside, for example, a member called an endless seal body or a sealing device such as an O-ring is attached to a ring-shaped groove (an annular groove) provided on one member side of two members opposed to each other and fastened to each other such as a shaft and a bearing.

By attaching such a seal body, a gap (space) formed between the two members can be physically closed, and a sealing structure can be constructed to prevent fluid or contaminants from entering to the gap and to restrict flow of fluid or the like between the two members.

The seal body is mainly formed of a rubber-like elastic body such as a hard rubber which is elastically deformable, and is mainly manufactured by pouring a raw material of a rubber-like elastic body having fluidity into a cavity of a mold which is previously engraved into a predetermined shape, curing the raw material by cooling or the like in the mold, and then demolding from the cavity of the mold (for example, refer to JP-A-2002-264004). The seal body thus obtained is provided with an elastic force and a repulsive force caused by the rubber-like elastic body of the raw material, whereby it is possible to seal between the two members. In order to construct a sealing structure, a large number of seal bodies having an annular shape, in other words, an endless shape, such as the O-ring described above, have been manufactured.

A method for manufacturing a seal body having an annular shape, such as an O-ring, will be explained in more detail. JP-A-2002-264004 discloses an O-ring molding die for forming an annular O-ring, wherein the O-ring molding die has a pair of molds (upper and lower molds) of the same shape that are symmetrical to a parting line, and the upper mold and lower side are superposed in a state in which the upper mold and the lower side are aligned with each other, and in a state of being mold clamped, an annular molding recessed part capable of configuring a planar annular O-ring vulcanization molding space is provided on the molding surfaces of the upper and lower molds, respectively.

As described above, in the case of a general seal body, since a mold (for example, a molding die) is used for processing into a predetermined shape, a manufacturing cost for manufacturing the molding die or the like may be required. In addition, in the case of a general annular seal body, it is necessary to form an attachment groove to attach the seal body in advance on the housing side to be attached, a processing step for providing such an attachment groove is required, the number of work steps may be increased and a processing cost for providing an attachment groove may be further required.

In addition, since the sealing structure is constructed using the reaction force of the seal body, depending on the size and shape of the seal body, there is a possibility that housing may be loaded, and there is a possibility that a housing or an attachment groove formed in the housing may be deformed or the like.

Here, as the seal body and the sealing device, those using solid seal bodies as described above were mainly exemplified and explained, but the seal body is not limited to this, for example, it is also performed to construct a sealing structure using a liquid-like gasket called a "liquid gasket".

However, in the case of a liquid gasket, it is necessary to apply a liquid material to a surface to be processed on which two members for obtaining a sealing structure overlap each other, and it is sometimes troublesome to form a liquid gasket such as protruding from a surface to be processed or flowing in the coating. In addition, since a large amount of time is required to affect the liquid gasket after the liquid material is applied, there is a possibility that the working time becomes long, and when the curing of the liquid gasket is completed, problems such as not being able to easily removed may occur.

In view of the above circumstances, an object of the present invention is to provide a method for manufacturing a seal body for manufacturing an endless (annular) seal body that has excellent attachability, can suppress manufacturing costs and processing costs, and does not apply an excessive load to a housing to be attached, and a seal body manufactured using the manufacturing method.

SUMMARY

According to the present invention, a method for manufacturing a seal body and a seal body that solve the above-described problems are provided below.

[1] A method for manufacturing a seal body whose main raw material is a compound containing a halogen group-containing monomer as a constitutional unit, the method includes a belt-like body forming step of adding a crosslinking agent to the compound to form a belt-like body from the obtained mixture, and a press-fixing step of press-fixing one end and the other end of the belt-like body obtained by the belt-like body forming step to form an endless seal body.

[2] The method for manufacturing a seal body according to [1], wherein, in the belt-like body forming step, the crosslinking agent is added so that the molar equivalent of the crosslinking agent with respect to a halogen group of the halogen group-containing monomer contained in the compound is in the range of 0.2 to 4.0.

[3] The method for manufacturing a seal body according to [1] or [2], wherein the belt-like body forming step includes two stages of kneading step including: a mill kneading step using a mill kneader which kneads the mixture using a rotor blade, and a roll kneading step using a roll kneader which kneads a mill kneaded material obtained by the mill kneading step between a plurality of rolls.

[4] The method for manufacturing a seal body according to [3], wherein the kneading conditions for the kneading step are as follows: the rotational speed of the rotor blade of the mill kneader performing the mill kneading step is in the range of 5 rpm to 20 rpm, the kneading temperature is in the range of 30° C. to 70° C., and the kneading time is in the range of 30 minutes to 60 minutes, and the rotational speed of the roll of the roll kneader performing the roll kneading step is in the range of 7 rpm to 20 rpm, the kneading temperature is in the range of 30° C. to 80° C., and the kneading time is in the range of 10 minutes to 30 minutes.

[5] The method for manufacturing a seal body according to any one of [1] to [4], wherein the belt-like body forming step includes a pressurizing step of pressurizing using a press machine, and the pressurizing conditions of the pressurizing step are such that the pressurizing pressure of the press machine is in the range of 95 to 105 $kgf/cm^2$, the pressurizing temperature is 150° C., the pressurizing time is 1 hour, and the thickness of the pressurized body after the pressurizing is adjusted to the thickness of 2 mm.

[6] The method for manufacturing a seal body according to any one of [1] to [5], wherein the press-fixing step further includes a press-fixing/heating step of press-fixing the one end and the other end of the belt-like body and then heating the belt-like body at 100° C. for 24 hours in the atmosphere.

[7] A seal body manufactured by the method for manufacturing a seal body according to any one of [1] to [6], wherein the compound includes an acrylic monomer derived constitutional unit derived from an acrylic monomer and a halogen group-containing monomer derived constitutional unit derived from the halogen group-containing monomer.

[8] The seal body according to [7], wherein the acrylic monomer is ethyl acrylate, the halogen group-containing monomer is 2-chloroethyl vinyl monomer, and the crosslinking agent is imidazole.

[9] The seal body according to [7] or [8], wherein the self-healing rate is 50% or more.

[10] The seal body according to any one of [7] to [9], wherein the adhesive strength to acrylonitrile-butadiene rubber is 0.30 N/mm or more and 0.70 N/mm or less.

[11] The seal body according to any one of [7] to [10], wherein the adhesive strength to nylon is 0.30 N/mm or more and 0.50 N/mm or less.

[12] The seal body according to any one of [7] to [11], wherein the adhesive strength to aluminium of 0.10 N/mm or more and 0.40 N/mm or less.

[13] The seal body according to any one of [7] to [12], wherein the reaction force at the time of 40% shrinkage is 200N or less.

[14] The seal body according to any one of [7] to [13], which has water resistance equivalent to IPX7.

Effects of the Invention

According to the method for manufacturing a seal body of the present invention, it is possible to form an endless seal body by using a compound such as an acrylic rubber containing a halogen group-containing monomer as a main raw material and press-fixing one end and the other end of the belt-like body formed by the belt-like body forming step. Accordingly, it is not necessary to use a conventional molding die, and an endless (annular) seal body can be easily formed with a reduced manufacturing cost. In addition, the obtained seal body has a self-healing function, thereby exhibiting excellent attachability and not being excessively loaded on a housing.

BRIEF DESCRIPTION OF THE DRAWINGS

FIGS. 2(*a*)-2(*d*) are explanatory drawings showing a schematic configuration of a pressurized body in FIG. 2(*a*), a belt-like body in FIG. 2(*b*), a press-fixing between ends of the belt-like body in FIG. 2(*c*), and an endless seal body in FIG. 2(*d*).

DETAILED DESCRIPTION

Figure 1:
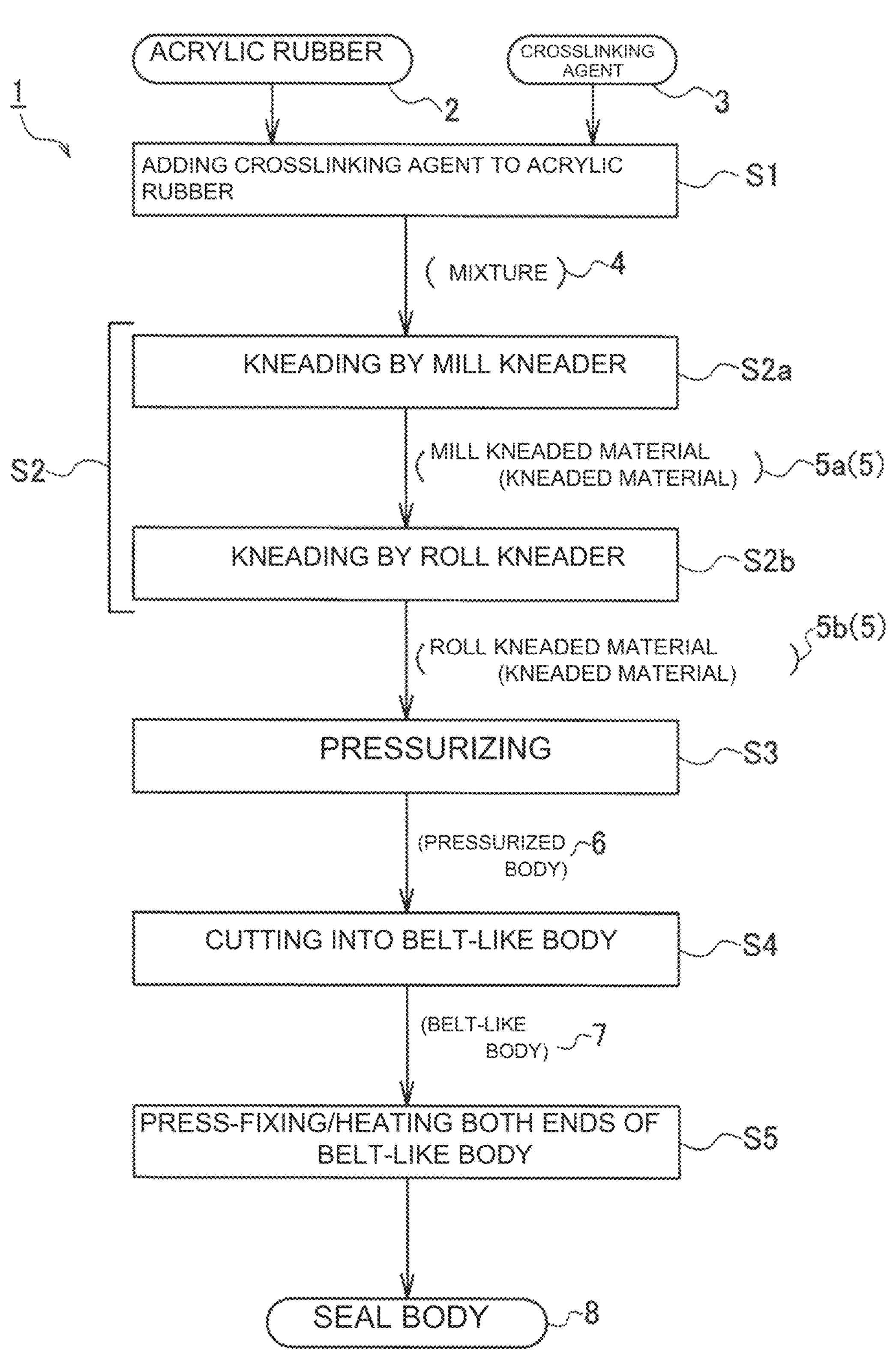
FIG. 1 is an explanatory drawing schematically showing a flow of a method for manufacturing a seal body of one embodiment of the present invention.

Hereinafter, embodiments of a method for manufacturing a seal body and a seal body of the present invention will be described in detail with reference to the drawings. It should be noted that the method for manufacturing seal body and the seal body of the embodiments of the present invention are not limited to those shown below, and various design changes, modifications, improvements, and the like can be made without departing from the gist of the present invention.

1. Method for Manufacturing Seal Body

As shown in FIGS. 1 to 6, a method 1 for manufacturing a seal body of an embodiment of the present invention includes a compound 2 containing a halogen group-containing monomer as a constitutional unit as a main raw material, and is mainly composed of a belt-like body forming step of adding a crosslinking agent 3 to the compound 2 to form a belt-like body 7 from the obtained mixture 4, and a press-fixing step S5 of press-fixing one end 7*a* and the other end 7*b* of the belt-like body 7 obtained by the belt-like body forming step to form an endless seal body 8.

The compound 2 to be the main raw material of the seal body 8 includes, for example, a constitutional unit of acrylic monomer derivation (an acrylic monomer derived constitutional unit) derived from an acrylic monomer and a constitutional unit of halogen group-containing monomer derivation (a halogen group-containing monomer derived constitutional unit) derived from a halogen group-containing monomer, and an acrylic rubber or the like configured to include each of these constitutional units as a repeating unit can be used. Further, as the acrylic monomer (acrylic monomer derived constitutional unit), for example, ethyl acrylate, butyl acrylate, methoxyethyl acrylate and the like can be used, while as the halogen group-containing monomer (halogen group-containing monomer derived constitutional unit), for example, 2-chloroethyl vinyl monomer such as 2-chloroethyl vinyl ether can be used. As the halogen group in the halogen group-containing monomer, a fluorine group, a butyl group, an iodine group, or the like may be used in addition to the above-described chlorine group.

The belt-like body forming step in the method 1 for manufacturing a seal body of the present embodiment is configured to include a crosslinking agent adding step S1 in which a predetermined addition amount of a crosslinking agent 3 is added to the compound 2 as the main raw material containing the halogen group-containing monomer, and the acrylic rubber 2 and the crosslinking agent 3 are uniformly mixed using a well-known stirrer (not shown) to form a mixture 4. Here, as the crosslinking agent 3, for example, an imidazole compound such as 1-butylimidazole can be added and used. That is, any crosslinking agent 3 can be used as long as it can be added to the compound 2 such as acrylic rubber and can be uniformly mixed, and the crosslinking reaction can proceed with the compound 2.

Here, the addition amount of the crosslinking agent 3 to the compound 2 in the crosslinking agent adding step S1 can be defined based on the following. That is, the molar equivalent of the crosslinking agent 3 to the halogen group of the halogen group-containing monomer contained in the acrylic rubber 2 may be in the range of 0.2 to 4.0.

When the range of such molar equivalents is converted into mol %, the addition amount of the crosslinking agent 3 may be in the range of 0.8 mol % to 4.2 mol % with respect to the addition amount of the acrylic rubber 2. By adding the crosslinking agent 3 having the molar equivalent (or mol %) of as defined above, the compound 2 can accelerate good crosslinking reaction.

The belt-like body forming step in the method 1 for manufacturing a seal body of the present embodiment is configured to include a kneading step S2 in which a specified amount of the crosslinking agent 3 is added by the crosslinking agent adding step S1, and the mixture 4 obtained by stirring with the acrylic rubber 2 and mixing the mixture so as to be uniform is further kneaded. Here, the kneading step S2 can be carried out using a well-known kneader, and is not particularly limited, and the mixture 4 is kneaded and adjusted to a predetermined viscosity.

For example, a mill kneader (not shown) for kneading the mixture 4 by using a rotor blade connected to a driving motor and rotating the rotor blade, a roll kneader (not shown) for kneading the mixture 4 between a plurality of rolls, and the like can be used.

Further, the kneading step S2 can be carried out in two steps using the above-described mill kneader and roll kneader as kneaders. Specifically, a mill kneading step S2*a* in which the mixture 4 obtained by the crosslinking agent adding step S1 is defined as a first step, and is kneaded using a mill kneader as a kneader, and a roll kneading step S2*b* in which the mill kneaded material 5*a* obtained by the mill kneading step S2*a* is defined as a second step, and is further kneaded using a roll kneader as a kneader, can be performed. Incidentally, the kneading step S2 is not limited to the above, and may be only one of the mill kneading step S2*a* and the roll kneading step S2*b*, or may be one in which the roll kneading step S2*b* is performed prior to the mill kneading step S2*a*.

Here, the kneading conditions for the mixture 4 in the kneading step S2 are not particularly limited, and for example, the rotational speed of the rotor blade in the mill kneader that performs the mill kneading step S2*a* can be set to a range of 5 rpm to 20 rpm, the kneading temperature can be set to a range of 30° C. to 70° C., and the kneading time can be set to a range of 30 minutes to 60 minutes, or the rotational speed of the roll in the roll kneader that performs the roll kneading step S2*b* can be set to a range of 7 rpm to 20 rpm, the kneading temperature can be set to a range of 30° C. to 80° C., and the kneading time can be set to a range of 10 minutes to 30 minutes.

In this way, by performing the kneading by the kneading step S2 described above (the mill kneading step S2*a* and the roll kneading step S2*b*), the mixture 4 delivered to the kneading step S2 is adjusted to a material having an appropriate viscosity and fluidity for performing the subsequent step.

The belt-like body forming step in the method 1 for manufacturing a seal body of the present embodiment is configured to include a pressurizing step S3 of pressurizing the kneaded material 5 obtained by the kneading step S2 using a press machine. In the pressurizing step S3, it is possible to use a well-known press machine, and by applying pressure while being heated at a predetermined pressurizing pressure, for example, an aggregated kneaded material 5 delivered from the kneading step S2 is thinly stretched to a predetermined thickness to form a thin plate-shaped pressurized body 6 (see FIG. 2(*a*)). Note that, although FIG. 2(*a*) shows a substantially square cut shape, the present invention is not limited to this.

The pressurizing conditions of the press machine in the pressurizing step S3 are not particularly limited, and by performing a press in a well-known press mold at, for example, pressurizing pressure: 95 to 105 kgf/cm$^2$, pressurizing temperature: 150° C., pressurizing time: 1 hour, or the like, a pressurized body 6 in which the pressurized body thickness t after pressurizing is adjusted to the thickness of 2 mm can be formed.

The belt-like body forming step in the method 1 for manufacturing a seal body of the present embodiment is configured to include a cutting step S4 of cutting the thin plate-shaped pressurized body 6 pressed so as to have a uniform pressurized body thickness t (e.g., the thickness of 2 mm) by the pressurizing step S3 into a belt-like body 7 (see FIG. 2(*b*)). Incidentally, the cutting step S4 is not particularly limited, any step that can cut the thin plate-shaped pressurized body 6 into a belt-like body 7 having a predetermined width (in other words, the aspect of the elongated shape) may be used, for example, it may be formed by cutting using a well-known cutting means (cutter) or the like, or by using a mold that matches the shape of the belt-like body 7 and demolding. As a result, it is possible to finally form the belt-like body 7 having an elongated shape (or a strip shape) having a predetermined width having a longitudinal direction and a lateral direction.

Further, in order to form the belt-like body 7, one end 7*a* and the other end 7*b* are provided at both longitudinal ends. That is, by the cutting step S4, an ended-shaped belt-like body 7 having a pair of ends 7*a* and 7*b* is formed.

The method 1 for manufacturing a seal body of the present embodiment further includes a press-fixing step of press-fixing one end 7*a* and the other end 7*b* of the belt-like body 7 having a predetermined width formed through the belt-like body forming step (see FIG. 2(*c*)). As a result, one end 7*a* and the other end 7*b* of the ended-shaped belt-like body 7 described above are integrated by press-fixing, the ends 7*a* and 7*b* disappear, and the seal body 8 having an endless shape (annular shape) is formed (see FIG. 2(*d*)).

Further, in the press-fixing step, the belt-like body 7 is deformed in a predetermined direction (the arrow direction in FIG. 2(*c*)) so as to bring the one end 7*a* and the other end 7*b* of the belt-like body 7 close to each other, and press-fixing is performed in such a deformed condition. As described above, the belt-like body 7 is made of a compound 2 such as acrylic rubber that has undergone the kneading step S2 and the pressurizing step S3 included in the belt-like body forming step as a main raw material, and has a property of being freely deformable as described above.

The press-fixing step in the method for manufacturing a seal body of the present embodiment may further include a press-fixing and heating step of holding the one end 7*a* and the other end 7*b* of the belt-like body 7 after being press-fixed and heating them in the atmosphere at 100° C. for 24 hours. Thus, the endless seal body 8 can be obtained by a crosslinking reaction of the compounds 2 constituting the belt-like body 7 progressing and the ends 7*a* and 7*b* being integrated.

As described above, in the method 1 for manufacturing a seal body of the present embodiment, a compound 2 or the like such as an acrylic rubber containing a halogen group-containing monomer as a constitutional unit is used as a main raw material, thereby it is possible to form an annular (endless) seal body 8 using a self-healing function by forming the material into a belt-like shape, and then bonding the ends 7*a* and 7*b* together. Therefore, there is no need for a mold unlike in the manufacturing of the conventional seal body, and the manufacturing costs and the like for such a mold can be reduced. Further, there is no excessive load on the housing side to which the seal body 8 is attached, and a processing step of providing a groove or the like in the housing can be omitted.

In addition, compared with the liquid gasket used in the related art, since the seal body 8 is a solid material, it does not flow out of the attachment site after being attached to the housing, and is easier to handle than the liquid gasket. In addition, it can be attached to the housing in a shorter time than the liquid gasket, and can be easily removed even after the attachment.

Furthermore, the seal body 8 manufactured by the method 1 for manufacturing a seal body of the present embodiment has the following properties. That is, the self-healing rate (which will be described in detail later) is 50% or more, the adhesive strength to acrylonitrile-butadiene rubber (NBR) is 0.30 N/mm or more and 0.70 N/mm or less, the adhesive strength to nylon is 0.30 N/mm or more and 0.50 N/mm or less, the adhesive strength to aluminium is 0.10 N/mm or more and 0.40 N/mm or less, and the reaction force at the time of 40% shrinkage is 200N or less. Furthermore, it has water resistance equivalent to IPX7.

EXAMPLES

Hereinafter, the present invention will be described in detail based on Examples, but the present invention is not limited to these Examples, and it is needless to say that the present invention can be implemented in various aspects as long as it falls within the technical scope of the present invention.

1. Method for Manufacturing Seal Body

The sealing bodies of Examples 1 to 9 and Comparative Examples 1 to 2 were prepared by using an acrylic rubber (corresponding to the compound in the present invention) described in Table 1 shown below as a main raw material and adding a crosslinking agent to the acrylic rubber, followed by kneading, pressurizing, and cutting steps included in the belt-like body forming step. In order to evaluate the performance of the seal bodies of Examples 1 to 9 and Comparative Examples 1 to 2, the thin plate-shaped pressurized body subjected to the pressurizing step is cut into the predetermined shape and size, and samples for evaluation are prepared, respectively. Therefore, the shape and the like of the endless seal body formed in the press-fixing step and the press-fixing/heating step in the method for manufacturing the seal body and the samples for evaluation may be different from each other.

TABLE 1

| | Example 1 | Ex. 2 | Ex. 3 | Ex. 4 | Ex. 5 | Ex. 6 | Ex. 7 | Ex. 8 | Ex. 9 | Comparative Example 1 | Comparative Example 2 |
|---|---|---|---|---|---|---|---|---|---|---|---|
| Acrylic rubber | Chlorine group acrylic rubber | | | | | | | | | | |
| Blending amount/ parts by weight | 100 | | | | | | | | | | |
| Crosslinking agent | 1-Butylimidazole | | | | | | | | | | Crosslinking agent a, b*1) |
| Addition amount of Crosslinking agent/parts by weight | 1 | 1.6 | 1.9 | 2.1 | 2.6 | 5.2 | 10.3 | 15.5 | 20.6 | 0.5 | a)3 b)1 |
| Molar equivalent | 0.2 | 0.3 | 0.37 | 0.4 | 0.5 | 1 | 2 | 3 | 4 | 0.1 | — |

*1)Crosslinking agent a: hydrotalcite, Crosslinking agent b: hexamethylene diamine carbamate Specifically, as an acrylic rubber containing a halogen group-containing monomer, a chlorine-group type acrylic rubber (NOXTITE A-1095: manufactured by Unimatec Co., Ltd.) is used, and 1-butylimidazole (manufactured by Tokyo Chemical Industry Co., Ltd.) is used as a crosslinking agent of Examples 1 to 9 and Comparative Example 1. Further, as a crosslinking agent of Comparative Example 2, hydrotalcite (DHT-4A: manufactured by Kyowa Chemical Industry Co., Ltd., crosslinking agent a) and hexamethylene diamine carbamate (CHEMINOX AC6-66: manufactured by Unimatec Co., Ltd., crosslinking agent b) are used.

(1) Addition of Crosslinking Agent (Crosslinking Agent Adding Step)

The addition amount of the crosslinking agent added to the acrylic rubber is 1.0 parts by weight of a crosslinking agent of 1-butylimidazole added to 100 parts by weight of the acrylic rubber in the case of Example 1 as shown in Table 1 above. In this case, the molar equivalent of the crosslinking agent to the halogen group of the halogen group-containing monomer is 0.2. These were mixed uniformly using a stirrer or the like to obtain a mixture of Example 1.

Similarly, based on Table 1 above, 1.6 parts by weight (molar equivalent: 0.3) of a crosslinking agent in Example 2, 1.9 parts by weight (molar equivalent: 0.37) of a crosslinking agent in Example 3, 2.1 parts by weight (molar equivalent: 0.4) in Example 4, 2.6 parts by weight (molar equivalent: 0.5) in Example 5, 5.2 parts by weight (molar equivalent: 1.0) in Example 6, 10.3 parts by weight (molar equivalent: 2.0) in Example 7, 15.5 parts by weight (molar equivalent: 3.0) in Example 8, and 20.6 parts by weight (molar equivalent: 4 0) in Example 9 were added to 100 parts by weight of acrylic rubber, respectively, and mixed uniformly to obtain mixtures of Examples 2 to 9.

In addition, 0.5 parts by weight (molar equivalent: 0.1) of a crosslinking agent was added to 100 parts by weight of acrylic rubber, and the mixture was uniformly mixed to obtain a mixture of Comparative Example 1. Further, in Comparative Example 2, 3 parts by weight of hydrotalcite and 1 part by weight of hexamethylenediamine carbamate were added as a crosslinking agent to 100 parts by weight of acrylic rubber, and mixed uniformly to obtain a mixture of Comparative Example 2.

(2) Kneading (Mill Kneading Step)

Using the acrylic rubber and the crosslinking agent described in Table 1 above, the mixtures of Example 1 to 9 and Comparative Examples 1 to 2, each containing a predetermined amount of the crosslinking agent added to the acrylic rubber, were kneaded by using a mill-kneader (Labo Plastomill 30C150: manufactured by Toyo Seiki Co., Ltd.). Here, the kneading conditions were adjusted such that the rotational speed of the rotor blade was 10 rpm and the temperature at the time of kneading was 60° C. or less, and kneading was performed for a kneading time of 20 minutes.

(3) Kneading (Roll Kneading Step)

The mill kneaded material obtained by the mill kneading step was kneaded using a roll kneader (LABORATORY MILL: manufactured by Kansai Roll Co., Ltd.). Here, the kneading conditions were adjusted such that the rotational speed of the roll was 10 rpm and the temperature at the time of kneading was 30 to 60° C., and further, kneading was performed for a kneading time of 30 minutes.

(4) Pressurizing (Pressurizing Step)

The kneaded products of Examples 1 to 9 and Comparative Examples 1 to 2 obtained by the roll kneading step were pressurized using a press machine (80TON press: manufactured by Hokutan Machinery Co., Ltd.). Here, the pressurizing conditions were such that the pressing pressure was 95 kgf/cm$^2$, the pressurizing temperature at the time of pressing was 150° C., the pressurizing time was 1 hour, using a pressing mold having a thickness of 2 mm. The pressurizing conditions of the kneaded product of Comparative Example 2 were such that the pressing pressure was 95 kgf/cm$^2$, the pressurizing temperature at the time of pressing was 170° C., the pressurizing time was 30 minutes, using a pressing mold having a thickness of 2 mm.

2. Evaluation of Self-Evaluation Function (1) Preparation of Measurement Samples for Evaluation A test piece 9 (see FIG. 3(*a*)) having a dumbbell-shaped No. 8 size defined in JIS K6251:2017 (Rubber, vulcanized or thermoplastic-Determination of tensile stress-strain properties) was punched out from the thin plate-shaped pressurized bodies having a thickness of 2 mm of Examples 1 to 9 and Comparative Examples 1 to 2 obtained by the pressurizing step, respectively, and was prepared as a measurement sample for evaluating the self-healing function. The center part of the obtained test piece 9 was cut with a knife, after dividing into the cutting test piece 11*a* having a cut surface 10*a* and the cutting test piece 11*b* having a cut surface 10*b* (see FIG. 3(*b*)), they are placed in an oven adjusted to 100° C. inside with the cut surfaces 10*a* and 10*b* of each cutting test piece 11*a* and 11*b* in close contact with each other and bonded together, and heated for 24 hours in the atmosphere. Thereby, the measurement sample 9*a* for evaluation of the self-healing function was obtained. In Examples 1 to 9 and Comparative Examples 1 to 2, samples for comparison, which were placed into an oven and heated in the atmosphere without being cut into the cutting test piece 11*a* and 11*b*, were also prepared.

TABLE 2

| | Example 1 | Ex. 2 | Ex. 3 | Ex. 4 | Ex. 5 | Ex. 6 | Ex. 7 | Ex. 8 | Ex. 9 | Comparative Example 1 | Comp. Ex. 2 |
|---|---|---|---|---|---|---|---|---|---|---|---|
| Possibility of forming seal body | good | good | good | good | good | good | good | good | good | bad | good |
| Self-healing rate/% | 72.4 | 80.3 | 88.2 | 84.8 | 68.2 | 52.6 | 55.4 | 33.6 | 44.6 | — | 21.8 |
| Peel strength with NBR/[N/mm] | 0.31 | 0.34 | 0.34 | 0.41 | 0.63 | 0.69 | 0.6 | 0.6 | 0.23 | — | 0.14 |
| Peel strength with nylon/[N/mm] | 0.48 | 0.43 | 0.43 | 0.46 | 0.45 | 0.38 | 0.3 | 0.22 | 0.14 | — | 0.13 |
| Peel strength with aluminium/[N/mm] | 0.35 | 0.4 | 0.36 | 0.35 | 0.32 | 0.37 | 0.24 | 0.19 | 0.15 | — | 0.06 |

(2) Evaluation of Possibility of Forming Seal Body

As shown in Table 2 below, it was shown that the measurement samples of Example 1 to 9, in which the addition amount of the crosslinking agent to be added to 100 parts by weight of the acrylic rubber corresponding to the scope of rights of the method for manufacturing a seal body of the present invention corresponds to 1.0 to 20.6 parts by weight (0.2 to 4 in terms of molar equivalent), were capable of forming a seal body (corresponding to "good" in Table 2). That is, by heating in a state of press-fixing and bonding, the cut surfaces 10*a* and 10*b* were bonded to each other, resulting in an integrated state.

Figure 3A:
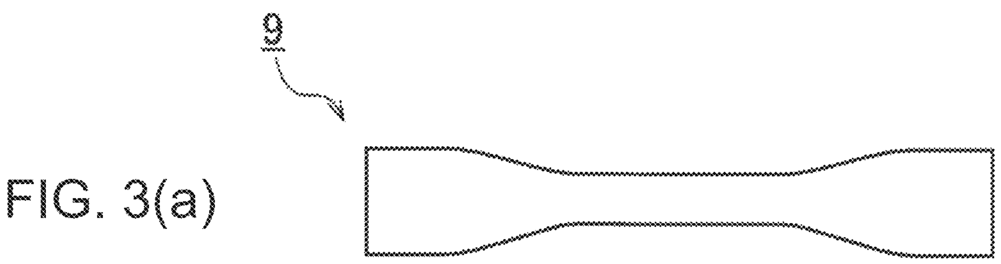
FIGS. 3(*a*)-3(*c*) are explanatory drawings showing a schematic configuration of a test piece in FIG. 3(*a*), a test cut piece in FIG. 3(*b*), and a measurement sample for evaluation for evaluating the self-healing function of the tensile test in FIG. 3(*c*).
Figure 3B:
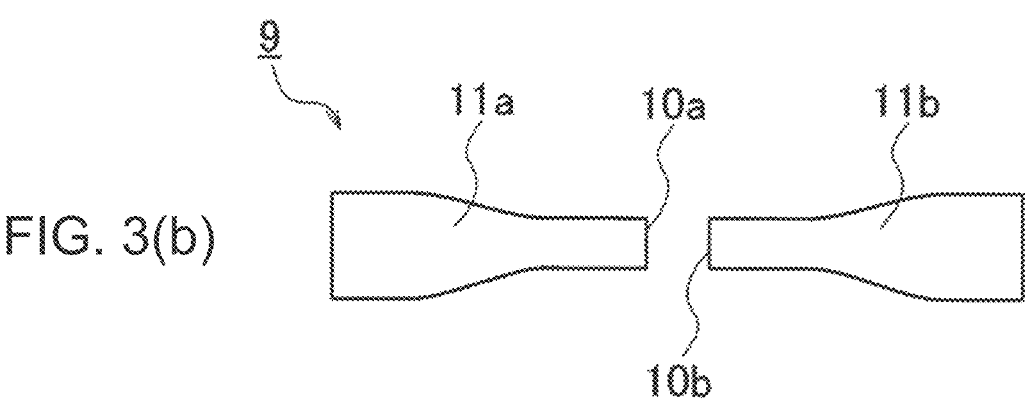
Figure 3C:
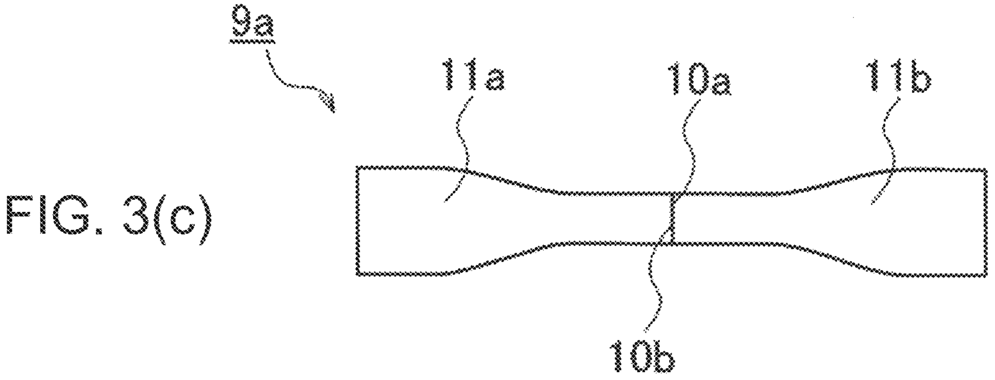

On the other hand, the measurement sample of Comparative Example 1, in which the addition amount of the crosslinking agent to be added to 100 parts by weight of the acrylic rubber deviating from the scope of rights of the method for manufacturing a seal body of the present invention corresponds to 0.5 parts by weight (0.1 in terms of molar equivalent), was difficult to form the seal body itself, and was not possible to produce the test piece 9 itself shown in FIG. 3(*a*) or the like (corresponding to "bad" in Table 2). On the other hand, in Comparative Example 2, it was possible to form a seal body.

(3) Evaluation of Self-Healing Rate

The measurement sample after heating was subjected to a tensile test using a tensile tester (Autograph AG-X: manufactured by Shimadzu Corporation) under the following conditions.

<Tensile Test Conditions>

Tensile rate: 500 mm/min

Ambient temperature: Room temperature

Ambient atmosphere: Atmosphere

Tensile tests were performed on the measurement samples for evaluating the self-healing function of Examples 1 to 9 and Comparative Example 2, and the respective samples for comparison, and the self-healing rate was evaluated as follows. That is, $$\text{Self-healing rate}(\%) = [\text{Tensile strength (N) of measurement sample for evaluation}] / [\text{Tensile strength (N) of sample for comparison}] \times 100$$

As shown in Tables 2, Examples 1 to 9 showed a self-healing rate of at least 30% or more with respect to the tensile strength of the sample for comparison, and in particular, Examples 1 to 5 were confirmed to have a higher self-healing rate of 65% or more. On the other hand, in Comparative Example 2, the self-healing rate was 21.8%, which was lower than that of Examples 1 to 9 and the like. Therefore, it is assumed that the measurement sample of Comparative Example 2 cannot exhibit high sealability. In Comparative Example 1, since the formation of the seal body itself was impossible, the self-healing rate was not evaluated.

As described above, it was confirmed that the seal body manufactured by the method for manufacturing a seal body of the present invention is excellent in self-healing rate. Therefore, it was confirmed that after cutting to a predetermined size, by performing a press-fixing step (or press-fixing/heating step) for heating by press-fixing one end and the other end to each other, the ends are integrated to exhibit sufficient strength. Therefore, it becomes possible to use as a seal body, and it is possible to exhibit high sealability, in other words, sufficient sealing performance.

(4) Compression Test

Compression test pieces (not shown) for the compression test evaluation of 15 mm×15 mm×8 mm were prepared from thin plate-shaped pressurized bodies having a thickness of 8 mm of Examples 1 to 9 obtained by the pressurizing step (however, using a pressing mold having a thickness of 8 mm), respectively. The obtained compression test piece was subjected to the compression test using a tensile tester (Autograph AG-IS 100 kN: manufactured by Shimadzu Corporation) under the following conditions.

<Compression Test Conditions>

Test speed: 5 mm/min

Measuring direction: Compression direction

Ambient temperature: Room temperature

Ambient atmosphere: Atmosphere

Max. load: 1500N

Under the compression test conditions described above, it was confirmed that the reaction force when the compression was performed so as to be 40% with respect to the height of the compression test piece prior to compression was all 200N or less.

3. Evaluation of Adhesiveness and Peelability

The measurement samples for evaluation for evaluating the adhesiveness and peelability were prepared from the pressurized bodies of Examples 1 to 9 and Comparative Examples 1 to 2 obtained by the pressurizing step, respectively, and the tensile strength test was performed using a peel strength tester (LTS-200N-S100: manufactured by Minebea Co., Ltd.) after pressurization under the following conditions.

<Preparation of Measurement Samples for Evaluation>

Measurement sample 12 for evaluation for evaluating the adhesiveness and peelability having a length of 50 mm to 70 mm, a width of 18 mm, a thickness of 2 mm, and an adhesive part with a size of 18 mm×18 mm, was prepared from a thin plate-like pressurized body having a thickness of 2 mm of Examples 1 to 9 and Comparative examples 1 to 2. On the other hand, plate shape bodies 13*a*, 13*b*, and 13*c* of different materials, each made of acrylonitrile-butadiene rubber (hereinafter referred to as "NBR"), nylon, and aluminium, each having the same size as the measurement sample 12 for evaluation to be evaluated for the adhesiveness and peelability and having a length of 50 mm to 70 mm, a width of 18 mm, and a thickness of 2 mm, were prepared.

Figure 4:
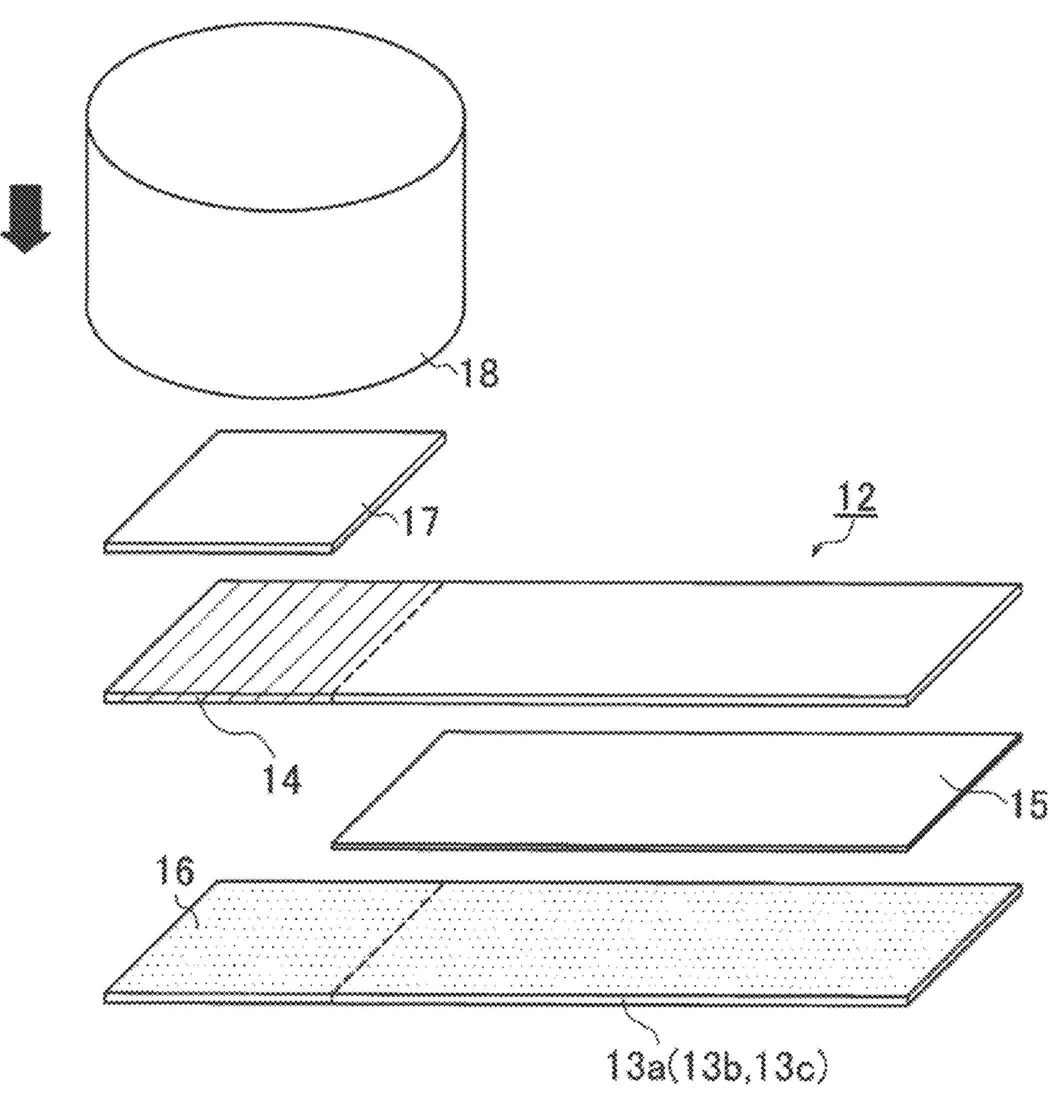
FIG. 4 is an explanatory drawing showing a schematic configuration of the adjustment of the measurement sample for evaluation for evaluating the adhesiveness and peelability.

As shown in FIG. 4, a plate shape body 13*a* or the like of a different material is placed, and only the upper surface of the area facing an adhesive part 14 of the measurement sample 12 for evaluation is exposed, and the other upper surface stacked so as to be covered with the fluororesin sheet 15. Further, the adhesive part 14 of 18 mm×18 mm of the measurement sample 12 for evaluation is placed at the position of the exposed area 16 of the plate shape body 13*a* or the like of a different material not covered with the fluororesin sheet 15 so as to overlap, and the stainless-steel plate 17, which is adjusted to the size of 18 mm×18 mm, is further placed on the top of the adhesive part 14. Thereafter, the weight 18 of 3.3 kg is placed on the stainless-steel plate 17, and the load (pressure) of the weight 18 is applied only on the adhesive part 14 (see FIG. 4). As a result, a stacked body in which the plate shape body 13*a* or the like of a different material, the fluororesin sheet 15, the measurement sample 12 for evaluation, the stainless-steel plate 17, and the weight 18 are stacked from below is formed, and the adhesive part 14 of the measurement sample 18 for evaluation and the exposed area 16 of the plate shape body 13*a* or the like of a different material are brought into close contact with each other by the load of the weight 18.

The stacked body is put into an oven (not shown) while maintaining such an adhesion state, and is heated at a heating temperature of 100° C. under atmospheric pressure for 24 hours. After 24 hours have elapsed, the stacked body is taken out of the oven, and the adhesiveness and peelability of the measurement sample for evaluation 12 to the plate shape body 13*a* or the like of a different material in the adhesive part 14 and the exposed area 16 are evaluated by the peel strength test.

<Measurement Conditions of Peel Strength>

Peel strength tester: LTS-200N-S100 (manufactured by Minebea Co., Ltd.)

Tensile strength: 50 mm/min

Temperature: Room temperature

Peel angle: 90°

On the basis of the above-described measurement conditions of peel strength, the peel strength at the adhered parts of the adhesive part 14 and the exposed area 16 required when the measurement sample for evaluation 12 was peeled off in the 90° direction with respect to the plate shape body 13*a* or the like of a different material was measured. The results are shown in Table 2 above.

As shown in Table 2, it was confirmed that Examples 1 to 9 exhibited a higher peel strength value of approximately equivalent (Example 9 only) or higher with respect to the peel strength value with NBR, nylon, and aluminium of Comparative Example 2. In particular, a remarkable increase in peel strength was observed compared to Comparative Example 2 in which aluminium was used as the plate member 13*c* of a different material.

As described above, it was confirmed that the seal body manufactured by the method for manufacturing a seal body of the present invention has high peel strength against different materials. That is, it was shown that the peel strength against different materials of NBR, nylon, and aluminium was higher than the peel strength of Comparative Example 2. Therefore, it becomes possible to use as a seal body, and it is possible to exhibit high scalability, in other words, sufficient sealing performance.

4. Evaluation of Water Resistance

Figure 5:
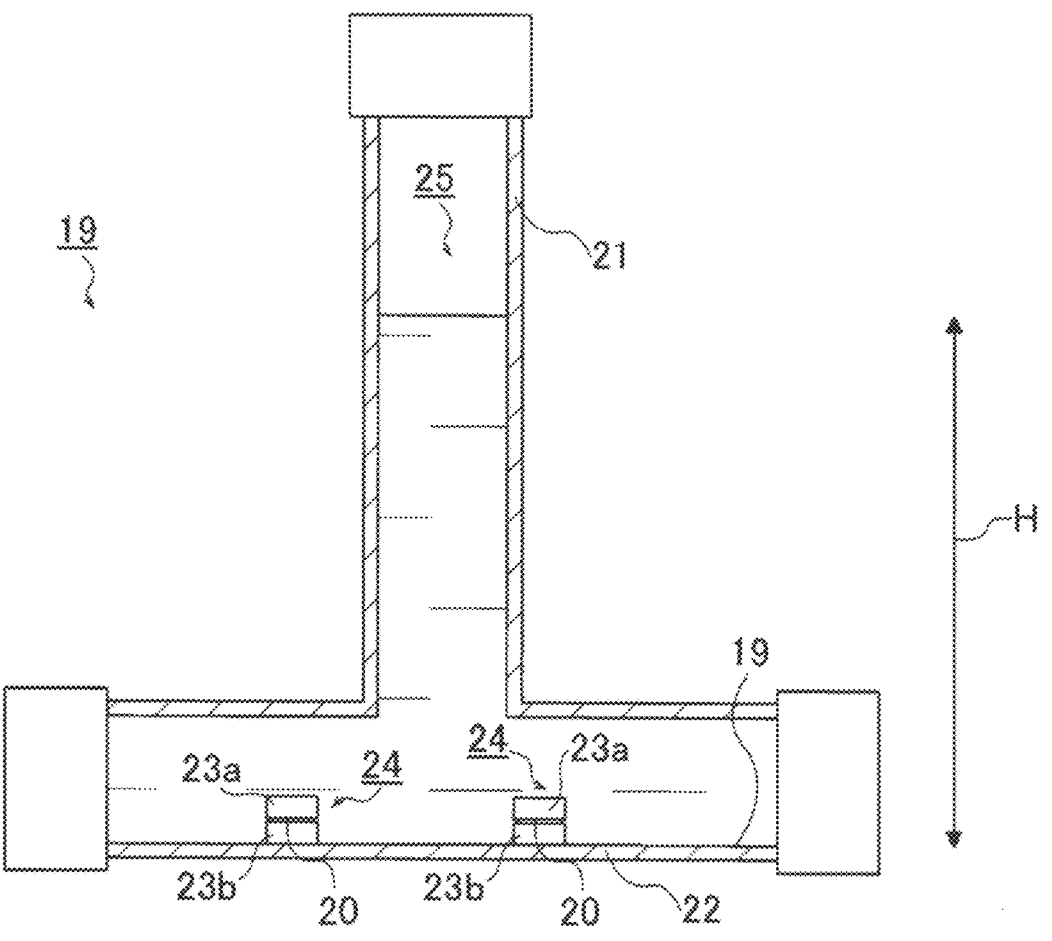
FIG. 5 is an explanatory drawing showing a schematic configuration of a submergence test jig.
Figure 6:
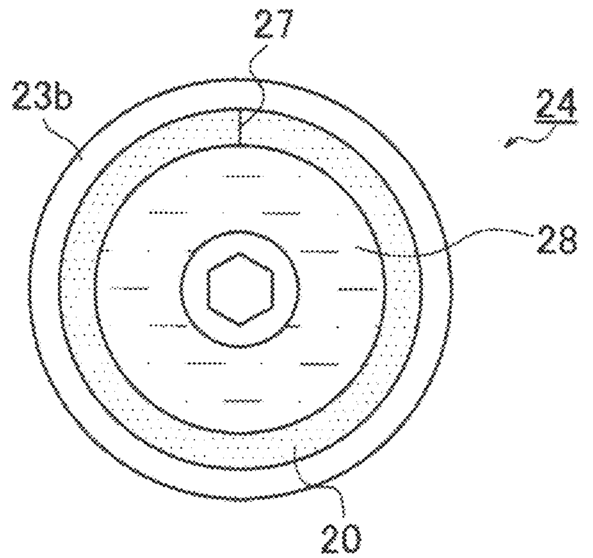
FIG. 6 is an explanatory drawing showing a schematic configuration of a water resistance measurement sample.

Water resistance was evaluated using a submergence test jig 19 shown in FIG. 5, and a water resistance measurement sample 20 made of an endless seal body shown in FIG. 6 (prepared by adding 0.37 equivalent amounts of 1-methylimidazole to a chlorine group-type acrylic rubber). More specifically, the submergence test jig 19 for evaluating the water resistance was constructed by combining a vertical pipe 21 and a horizontal pipe 22, and was adjusted so that the pipe water depth H was 1 m. The sample 24 which is formed by arranging an acrylic cylindrical member 23*a* above and SUS cylindrical member 23*b* below, sandwiching a water resistance measurement sample 20 between the acrylic cylindrical member 23*a* and the SUS cylindrical member 23*b* by adjusting the compression rate to be 10%, was left to stand in a pipe bottom 26 of a pipe inner space 25, and held in such a standing condition for 30 minutes. As schematically shown in FIG. 6, the water resistance measurement sample 20 has an endless shape having a joining part 27 which is press-fixed, and a water leakage detection seal 28 capable of detecting water leakage by the contact with water is disposed in an inner space (annular space) surrounded by the water resistance measurement sample 20. FIG. 6 shows a drawing in which the acrylic cylindrical member 23*a* is removed and the water resistance measurement sample 20 is viewed from above.

After standing for 30 minutes, the water resistance measurement sample 20 was taken out from the submergence test jig 19, and the presence or absence of water leakage to the water leakage detection seal 28 was visually confirmed to have water resistance equivalent to IPX7.

INDUSTRIAL APPLICABILITY

The method for manufacturing a seal body and the seal body of the present invention have industrial applicability in the industrial field using various mechanical parts and the like using the seal body.

The invention claimed is:

1. A method for manufacturing a seal body whose main raw material is a compound containing a halogen group-containing monomer as a constitutional unit, the method comprising:

a mixing step of forming a mixture of the halogen group-containing monomer and a cross-linking agent;

a mill kneading step of using a mill kneader to knead the mixture using a rotor blade;

a roll kneading step of using a roll kneader to knead a mill kneaded material obtained by the mill kneading step between a plurality of rolls;

a pressurizing step of pressurizing a roll kneaded material obtained by the roll kneading step using a press machine, wherein the pressurizing conditions of the pressurizing step include a pressurizing pressure of the press machine in a range of 95 to 105 $kgl/cm^2$, a pressing temperature of 150° C., a pressing time of 1 hour, and a thickness of a pressurized body after pressurizing is adjusted to a thickness of 2 mm;

a belt-like body forming step of forming a belt-like body from the pressurized body by cutting the pressurized body to form the belt-like body, and a press-fixing step of press-fixing one end and the other end of the belt-like body obtained by the belt-like body forming step to form an endless seal body.

2. The method for manufacturing a seal body according to claim 1, wherein, in the belt-like body forming step, the crosslinking agent is added so that the molar equivalent of the crosslinking agent with respect to a halogen group of the halogen group-containing monomer contained in the compound is in the range of 0.2 to 4.0.

3. The method for manufacturing a seal body according to claim 1, wherein the rotational speed of the rotor blade of the mill kneader performing the mill kneading step is in the range of 5 rpm to 20 rpm, the mill kneading temperature is in the range of 30° C. to 70° C., and the mill kneading time is in the range of 30 minutes to 60 minutes, and the rotational speed of the roll plurality of rollers of the roll kneader performing the roll kneading step is in the range of 7 rpm to 20 rpm, the roll kneading temperature is in the range of 30° C. to 80° C. and the roll kneading time is in the range of 10 minutes to 30 minutes.

4. The method for manufacturing a seal body according to claim 1, wherein the press-fixing step further comprises a press-fixing/heating step of press-fixing the one end and the other end of the belt-like body and then heating the belt-like body at 100° C. for 24 hours in the atmosphere.

* * * * *